United States Patent [19]
Koide

[11] Patent Number: 4,515,391
[45] Date of Patent: May 7, 1985

[54] VEHICLE SUSPENSION WITH LATERAL MEMBER

[75] Inventor: Masaru Koide, Tokyo, Japan

[73] Assignee: Nissan Motor Company, Limited, Japan

[21] Appl. No.: 487,155

[22] Filed: Apr. 21, 1983

[30] Foreign Application Priority Data

May 31, 1982 [JP] Japan .................. 57-80457[U]

[51] Int. Cl.³ ............................................... B60G 3/00
[52] U.S. Cl. ..................................... 280/690; 280/701
[58] Field of Search ............... 280/701, 700, 690, 688, 280/724

[56] References Cited

U.S. PATENT DOCUMENTS

| | | | |
|---|---|---|---|
| 3,926,454 | 12/1975 | Winsen | 280/701 |
| 4,245,853 | 5/1981 | Inoue | 280/701 |
| 4,269,432 | 5/1981 | Inoue et al. | 280/690 |

FOREIGN PATENT DOCUMENTS

| | | |
|---|---|---|
| 236787 | 2/1975 | Fed. Rep. of Germany. |
| 2450755 | 4/1976 | Fed. Rep. of Germany ...... 280/690 |
| 2645272 | 4/1978 | Fed. Rep. of Germany ...... 280/690 |
| 2818198 | 10/1979 | Fed. Rep. of Germany ...... 280/690 |
| 2921365 | 12/1979 | Fed. Rep. of Germany. |

OTHER PUBLICATIONS

"Motor", Oct. 25, 1980, page 49.

*Primary Examiner*—Richard A. Bertsch
*Attorney, Agent, or Firm*—Leydig, Voit, Osann, Mayer and Holt, Ltd.

[57] ABSTRACT

In a vehicle suspension of the type having a transverse wheel support arm, a lever arm pivotably mounted on the vehicle body supports the inboard end of at least one wheel support arm. The lever arm and the support arm or arms are normally nearly perpendicular, but in response to transversely directed forces on the wheel at the outboard end of the support arm or arms, the angularly relationship between the lever arm and the support arm changes so as to cause the wheel to toe-in.

16 Claims, 7 Drawing Figures

VEHICLE SUSPENSION WITH LATERAL MEMBER

BACKGROUND OF THE INVENTION

The present invention relates generally to a vehicle suspension, especially to a vehicle rear suspension, subject to changes in toe-in during roll or compliance steering. More particularly, the invention relates to a vehicle suspension having a member extending laterally with respect to the longitudinal axis of the vehicle.

As is well known, in order to ensure driving stability and sufficient traction of the road wheels while a vehicle is moving through a corner or a curve, it is necessary to have an adequate cornering force in the suspension. To obtain sufficient cornering force, it is necessary to keep the wheels aligned in weak understeer. On the other hand, compliance steering, roll steering and camber change are apt to occur in response to the lateral force applied to the road wheels as the vehicle passes through the curve or corner. Generally, compliance steering is caused by deformation of the bushing interpositioned between a wheel suspending member and the vehicle body and roll steering is due to suspension geometry.

The compliance steering in response to lateral forces as the vehicle moves through corners or curves is apt to cause toe-out resulting in reduction of cornering force. Also in response to the lateral force, camber change is apt to occur in the positive direction to further decrease cornering force.

In a suspension with a transverse wheel suspending member, such as a transverse arm suspension or a transverse link suspension, the wheel suspending member is secured to the vehicle body via a bushing assembly which is deformed during compliance steering, resulting in toe angle change. The magnitude and direction of the toe angle change during compliance or roll steering is determined by various factors such as suspension geometry, wheel alignment, deformation characteristics of the rubber bushing in the bushing assembly and the hardness of bushing assemblies at respective pivot points. Therefore, suspension tuning must be performed quite carefully to ensure suitable toe-in characteristics during compliance or roll steering.

The present invention is intended to provide a vehicle suspension which ensures toe-in in response to lateral forces applied to the road wheel.

SUMMARY OF THE INVENTION

Therefore, it is an object of the present invention to provide a vehicle suspension which produces adequate cornering force and driving stability by causing a toe-in change in response to lateral forces, resulting in understeering.

To accomplish, the above-mentioned and other object, there is provided a vehicle suspension having a laterally extending wheel suspending member through which a road wheel of the vehicle is suspended from the vehicle body. The wheel suspending member is connected to a rotatable member which is secured onto the vehicle body via a bushing assembly which allows rotational movement of the rotatable member. The rotatable member and the wheel suspending member are so related as to allow change in the suspension geometry resulting in toe-in change in response to lateral forces applied to the road wheel.

Accordingly, the invention ensures toe-in change during compliance or roll steering due to the action of the rotatable member. In addition, since the toe-in angle change can be determined by the shifting distance of the pivot portion between the wheel suspending member and the rotatable member, and since the shifting distance is proportional to the distance between the foregoing pivot portion and the pivot portion between the vehicle body and the rotatable member, the toe-in change characteristics can be adjusted by adjusting the distance between the pivot portions.

BRIEF DESCRIPTION OF THE INVENTION

The present invention will be understood more fully from the detailed description given herebelow and from the accompanying drawings of the preferred embodiments of the invention, which, however, should not be taken as limitative to the invention but for elucidation and explanation only.

DESCRIPTION OF THE PREFERRED EMBODIMENT

Figure 1:
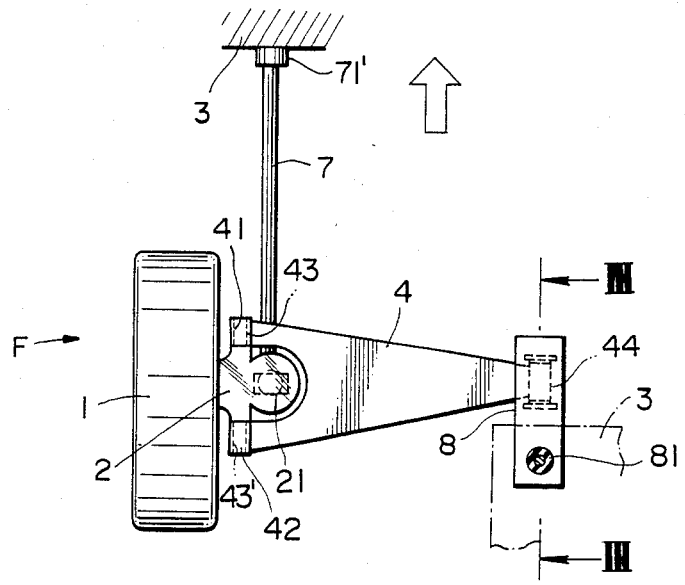
FIG. 1 is a fragmentary plan view of the first embodiment of a vehicle suspension according to the present invention.
Figure 2:
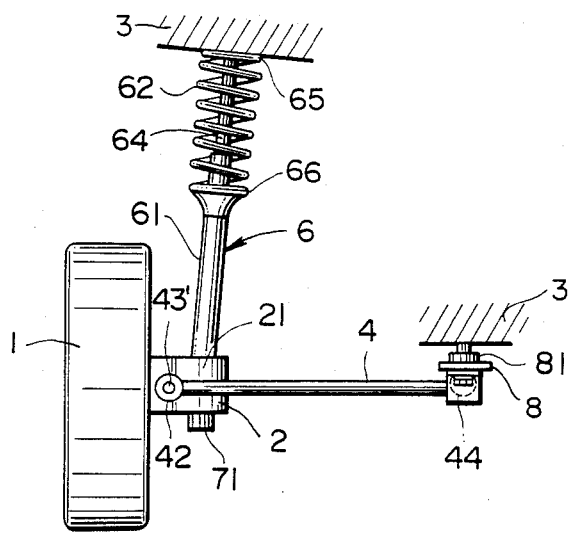
FIG. 2 is a fragmentary front elevation of the vehicle suspension of FIG. 1.

Referring now to the drawings, particularly to FIGS. 1 and 2, there is provided the first embodiment of a vehicle suspension according to the present invention. A road wheel 1 is rotatably mounted at the outer or first end of a wheel suspending lateral arm or member 4 which extends transversely with respect to the vehicle body 3 via a knuckle 2. The outer end of the wheel suspending lateral arm 4 is bifurcated and has a pair of cylindrical end sections 41 and 42. Each cylindrical section 41 and 42 houses a bushing assembly 43 or 43'. The front and rear ends of knuckle 2 engage the cylindrical end sections 41 and 42 via the bushing assemblies 43, 43' respectively. The bushing assemblies 43, 43' are colinear and the axes thereof are aligned parallel to the longitudinal axis of the vehicle.

The knuckle 2 supporting the road wheel 1 is suspended from a vehicle body 3 by a suspension strut assembly 6 which comprises a shock absorber 61 and a suspension coil spring 62. The lower end of the shock absorber 61 is engaged to the knuckle 2 at a point 21. On the other hand, the top of a piston rod 64 of the shock absorber 61 is fixed to the vehicle body 3. The upper end of the suspension col spring 62 abuts the upper spring seat 65 secured to a point near the top of the piston rod 64. The lower end of the suspension coil spring 62 seats onto a lower spring seat 66 secured to the shock absorber cylinder or strut. The suspension strut assembly 6 damps relative vertical displacements between the vehicle body 3 and the road wheel 1 and thus absorbs mainly vertical road shocks. In turn, the suspension assembly 6 transmits the load due to the vehicle body 3 to the road wheel 1 for road/tire traction.

The rear end of a rigid tension rod 7 is also engaged to the knuckle 2 via a bushing assembly 71. The front end of the tension rod 7 is engaged to the vehicle body 3 via the bushing assembly 71'.

The inner or second end of the wheel suspending lateral arm 4 is connected to a rotatable member or lever arm 8 via a bushing assembly 44 so that it can pivot within a vertical plane about a horizontal pivot axis to permit vertical displacement of the vehicle body 3 and the road wheel 1 with respect to each other. In addition, the bushing assembly 44 elastically allows a slight horizontal displacement of the lateral arm 4 with respect to the member 8. The rear end of the member 8 is, in turn, secured to the vehicle body 3 via a bushing assembly 81. The bushing assembly 81 elastically allows horizontal pivotal displacement of the member 8.

Figure 3:
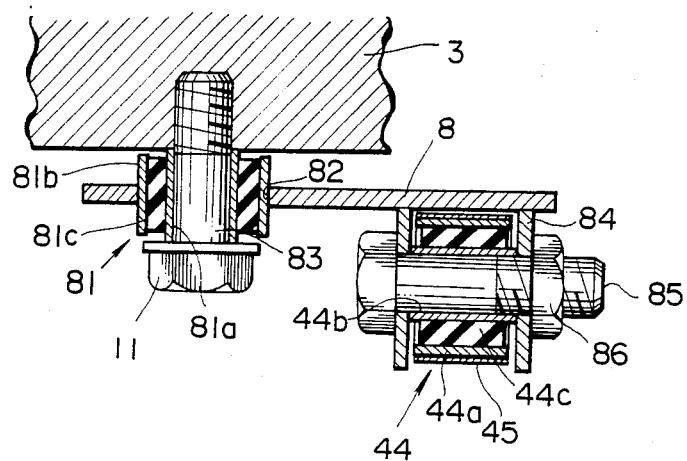
FIG. 3 shows a cross-section taken along line III—III of FIG. 1.

FIG. 3 shows the details of the member 8 and bushing assemblies 44 and 81. The member 8 has a circular opening 82 near its rear end to receive the bushing assembly 81. The bushing assembly 81 comprises outer and inner cylinders 81a and 81b and an annular rubber bushing 81c. The outer periphery of the outer cylinder 81a mates with the inner periphery of the circular opening 82. On the other hand, a fastener bolt 83 extends through the inner cylinder 81b to fasten the latter to the vehicle body 3.

A bracket 84 extends from the lower surface of the member 8 near the free end of the member. The bushing assembly 44 is received in a cylindrical end 45 of the lateral arm positioned within the bracket 84 and comprises outer and inner cylinders 44a and 44b and an annular rubber bushing 44c interposed between the outer and inner cylinders. A pivot bolt 85 passes through the inner cylinder 44b of the bushing assembly to engage with a nut 86 on the opposite side of the bracket.

In this construction, the member 8 can be displaced horizontally by elastic deformation of the rubber bushing 81c of the bushing assembly 81. On the other hand, the lateral arm 4 is rotatable about the axis of the pivot bolt 85 in the vertical direction. Also, the deformation of bushing assembly 44 allows the lateral arm 4 to move slightly horizontally.

Figure 4:
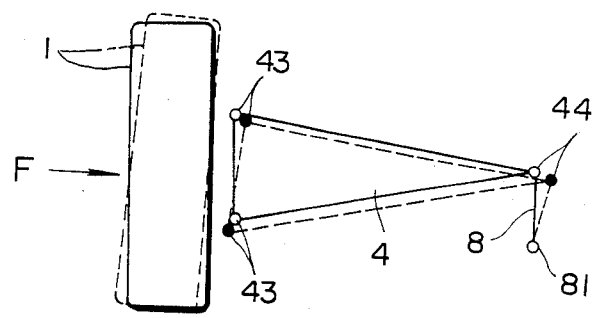
FIG. 4 is an illustration of the suspension geometry in the vehicle suspension of FIG. 1.

Changes in suspension geometry in response to compliance or roll steering according to the foregoing first embodiment will be described herebelow with reference to FIG. 4 in which the suspension is represented solely by the axes thereof for clearer illustration of the function. Assuming the vehicle is turning towards the right in the drawing, a lateral steering force F must be applied to the road wheel 1. This lateral force is transmitted to the member 8 via the lateral arm 4. In response to the lateral force F, the member 8 is thus rotated clockwise due to deformation of the rubber bushing 81c of the bushing assembly 81. As a result, the position of the bushing assembly 44 is shifted along a circle of fixed radius about the bushing assembly 81. This causes the lateral arm 4 to shift to the position illustrated in phantom lines in FIG. 4.

As apparent herefrom, the forward bushing assembly 43 is shifted inwardly and the rearward bushing assembly 43' is shifted outwardly or inwardly to a lesser degree than the forward bushing assembly. According to this shifting of the lateral arm 4, the toe angle of the road wheel 1 changes in the toe-in direction.

Figure 5:
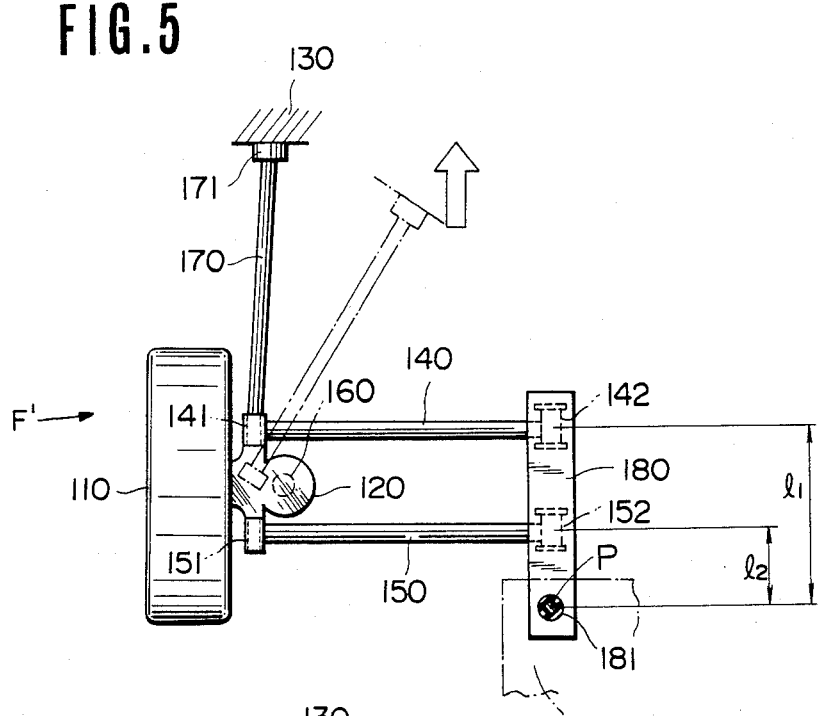
FIG. 5 is a fragmentary plan view of the second embodiment of the vehicle suspension according to the invention.

FIG. 5 shows the second embodiment of the vehicle suspension according to the invention. The shown second embodiment is directed to a lateral link-type suspension having first and second lateral links 140 and 150 extending laterally with respect to the vehicle axis and parallel to each other. The outer end of each of the lateral links 140 and 150 is pivotably connected to the knuckle 120 via a bushing assembly 141 or 151. The inner end of each of the lateral links 140 and 150 is connected to the member 180 via a bushing assembly 142 or 152. The rearward end of the member 180 is secured to the vehicle body 130 via a bushing assembly 181 which has a vertical axis.

As in the foregoing first embodiment, the knuckle 120 rotatably supports the road wheel 110 via a wheel hub (not shown) and is connected to the rear end of the rigid tension rod 170 via the bushing assembly 171. The front end of the rigid tension rod is connected to the vehicle body 130. In addition, the knuckle 120 is connected to the lower end of the shock absorber assembly 160.

In this structure, the member 180 is responsive to a lateral force F' such as cornering force to rotate clockwise in FIG. 5 about the bushing assembly 181 as the latter deforms. By this rotation, the inner ends of the lateral links 140 and 150 are shifted inwardly. In the case shown, the inner end of the lateral link 140 is positioned near the front end of the member 180 at a distance $l_1$ from the rotational pivot P which is larger than that $l_2$ between the inner end of the lateral link 150 and the pivot P. Therefore, the bushing assembly 142 shifts farther inward than the bushing assembly 152. This causes a change in the toe-in angle towards understeering characteristics and thus provides satisfactory driving stability.

In FIG. 5, it is possible to offset the point of attachment of the rigid tension rod 170 to the vehicle body to cant the longitudinal axis thereof with respect to the longitudinal vehicle axis, as illustrated in phantom line. In this case, the rigid tension rod 170 would serve to resist the lateral force and thus increase rigidity for cornering. As a result, toe angle change in the toe-out direction change is satisfactorily reduced.

Figure 6:
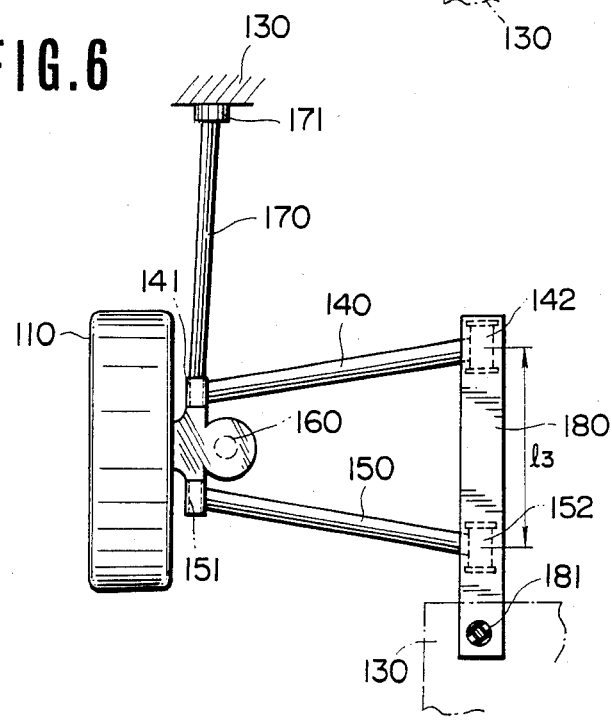
FIG. 6 is a fragmentary plan view of a modification of the second embodiment of FIG. 5.

FIG. 6 shows a modification of the foregoing second embodiment of the present invention. In this modification, the lateral link 140 is canted rearward toward the wheel 110 and, on the other hand, the lateral link 150 is canted forward toward the wheel 110. As a result, span $l_3$ between the bushing assemblies 142 and 152 is larger than that $l_1$–$l_2$ between the bushing assemblies 141 and 151. This causes the difference between shifting distances of the bushing assemblies 142 and 152 due to pivotal movement of the member 180 to be larger than that of the foregoing second embodiment.

The toe-angle change in response to the lateral force is generally determined by the dimensional relationship between the bushing assemblies 142, 152 and 181. Therefore, by adjusting the cant of the lateral links 140 and 150 during suspension tuning, the toe-angle change can be determined as desired to obtain the desired compliance or roll steering characteristics.

In addition, by canting the lateral links 140 and 150, it is possible to provide a damping force against pitching forces applied to the lateral links to reduce pitching movement such as nose-dive and winding-up.

Figure 7:
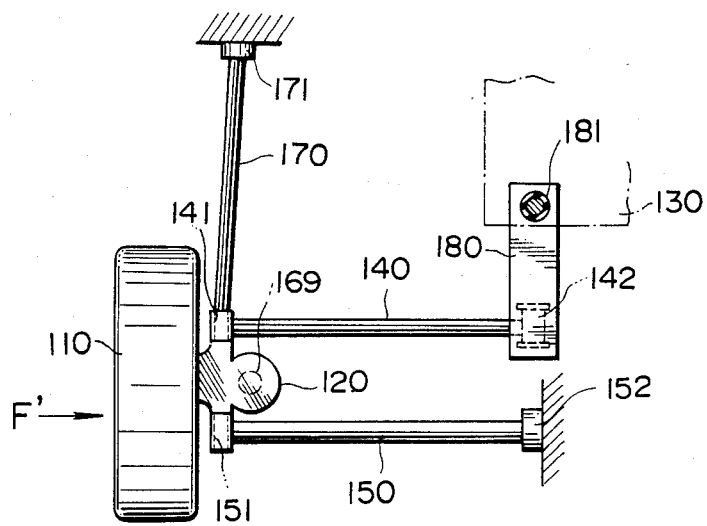
FIG. 7 is a fragmentary plan view of another modification of the second embodiment of FIG. 5.

FIG. 7 shows another modification of the second embodiment. In this modification, the inner end of the lateral link 150 is secured to the vehicle body 130 via the bushing assembly 152. On the other hand, the inner end of the lateral link 140 is secured to the member 180, the front end of which is secured to the vehicle body 130 via the bushing assembly 181. The member 180 can pivot as the bushing assembly 181 deforms in response to the lateral force applied to the road wheel. Thus, the toe angle will change in the toe-in direction in response to a lateral force F.

It is possible, in this embodiment, to pivot the member 180 at its rear end as in the foregoing embodiments.

What is claimed is:

1. In a vehicle suspension, a support for carrying a road wheel on the vehicle body comprising:
    a wheel suspending member extending essentially transversely with respect to the vehicle body and supporting a road wheel at a first end thereof;
    a shock absorber for damping predominantly vertical displacements between the vehicle body and said road wheel, and connecting said wheel suspending member to the vehicle body; and
    a rotatable member connecting the second end of said wheel suspending member to said vehicle body, said rotatable member having a vertical pivot axis fixed relative to the vehicle body for pivotal movement thereabout and adapted to horizontally pivot and carry said wheel suspending member inwardly toward the vehicle body in response to transverse forces acting on the road wheel to cause the road wheel to toe in.

2. The suspension as set forth in claim 1, which further comprises a rigid member connecting the first end of said wheel suspending member to the vehicle body in a fixed spatial relatioship.

3. The suspension as set forth in claim 1, wherein said rotatable member is secured to the vehicle body via an elastic bushing having its pivotal axis aligned vertically and deformable to allow pivotal movement of the rotatable member.

4. The suspension as set forth in claim 2, wherein one end of said rotatable member is fixed to the vehicle body through an elastic bushing which is deformable to allow horizontal pivotal movement of the rotatable member, and the free end thereof is connected to the wheel suspending member via a horizontal pivot allowing pivotal movement of the wheel suspending member in a vertical plane.

5. The suspension as set forth in claim 4, wherein said wheel suspending member is a transversely extending suspension arm.

6. The suspension as set forth in claim 4, wherein said wheel suspension member comprises a pair of first and second lateral links extending transversely.

7. The suspension as set forth in claim 6, wherein at least one of said first and second lateral links is canted with respect to a perpendicular to the vehicle axis so as to expand the distance between the wheel-supporting ends of the lateral links in relation to that between the other ends thereof.

8. The suspension as set forth in claim 6, wherein said first lateral link is located forward of the second lateral link with respect to the direction of normal vehicle travel and is connected to the rotatable member, and said second lateral link is pivotably secured to the vehicle body.

9. In a vehicle suspension for a land vehicle with non-steerable road wheels aligned at a toe angle which is normally near the direction of travel of the vehicle, a support for carrying a road wheel on the vehicle body comprising:
    (a) a lateral wheel suspending member having a first end supporting a road wheel at at least two points separated in the direction of travel in a fixed spatial relationship and extending toward the body of the vehicle in a direction predominantly perpendicular to the direction of travel; and
    (b) a lever arm pivotably supported by the vehicle body and supporting a second end of said wheel suspending member, said lever arm extending in the direction of travel, an assembly connected to said vehicle body supporting said lever arm for free pivotable movement about a vertical axis to pivot within a horizontal plane in response to transverse forces acting on the road wheel to cause said wheel suspending member both to pivot and move twoard the body of the vehicle and cause the road wheel to toe in.

10. The suspension of claim 9, wherein said wheel suspending member comprises a rigid arm with said first end being bifurcated, the branches of the bifurcated end being attached to the road wheel and the second end being pivotably attached to said lever arm at a point separated from the vertical axis of support of the latter.

11. The suspension of claim 9, wherein said wheel suspending member comprises two rigid arms, each attached at a first end to the road wheel and at a second end to the lever arm.

12. The suspension of claim 11, wherein the points of attachment of the rigid arms to the lever arm are separated by a greater distance than the points of attachment of the rigid arms to the road wheel.

13. The suspension of claim 9, wherein said wheel suspending member comprises two rigid arms, each attached at a first end to the road wheel, one of the rigid arms having a second end attached to the lever arm and the other rigid arm having a second end attached directly to the vehicle body.

14. The suspension of claim 9, 10, 11, 12 or 13, further comprising a shock absorber connected at one end to the road wheel and at the other end to a point of the vehicle body substantially directly above the road wheel for damping vertical displacements of the road wheel with respect to the vehicle body.

15. The suspension of claim 9, 10, 11, 12 or 13, further comprising a tension rod connected at one end to the road wheel and at the other end to the vehicle body, the tension rod extending substantially in the direction of travel.

16. The suspension of claim 9, 10, 11, 12 or 13 further comprising a tension rod connected at one end to the road wheel and at the other end to the vehicle body, the tension rod extending from the road wheel at an acute angle with respect to said one wheel suspending member.

* * * * *